March 3, 1936.   H. DE HAVEN   2,032,739
SELF SHARPENING RAZOR
Filed June 20, 1930   3 Sheets-Sheet 2
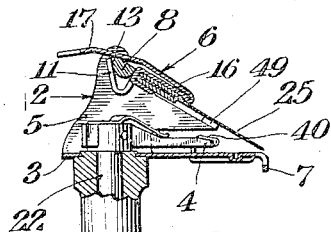
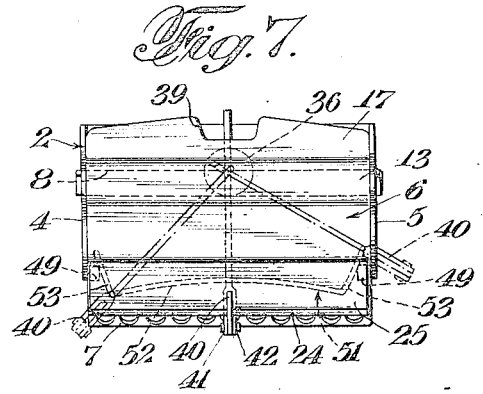
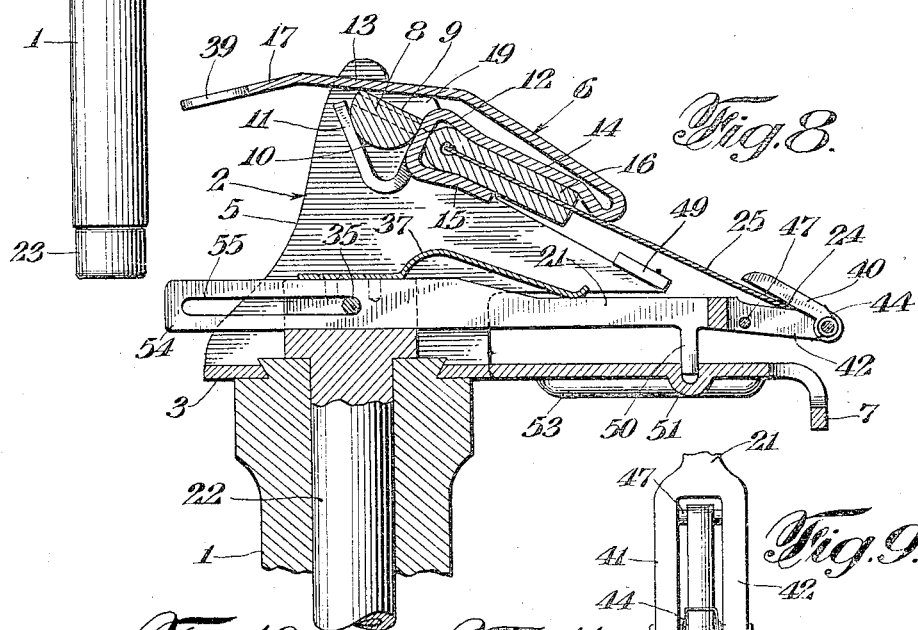
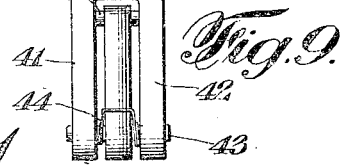
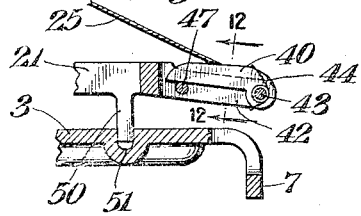
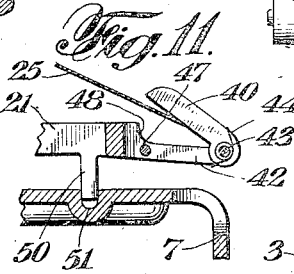
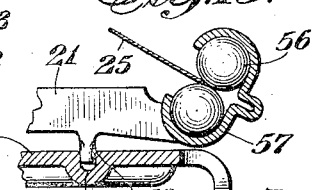
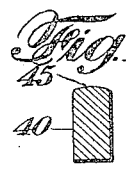
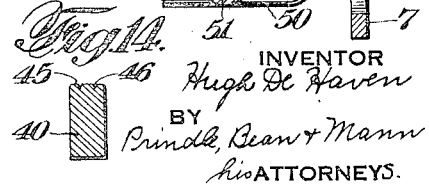
INVENTOR
Hugh De Haven
BY
Prindle, Bean & Mann
his ATTORNEYS.

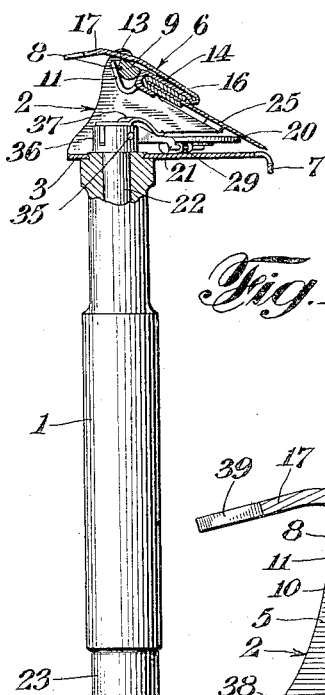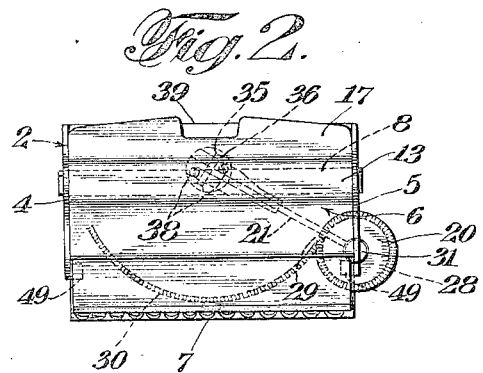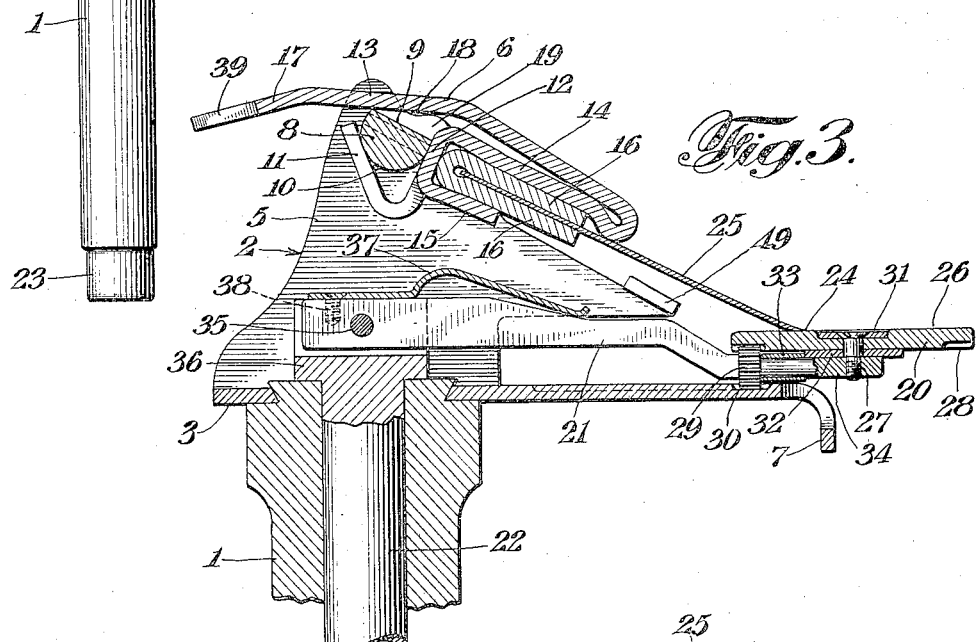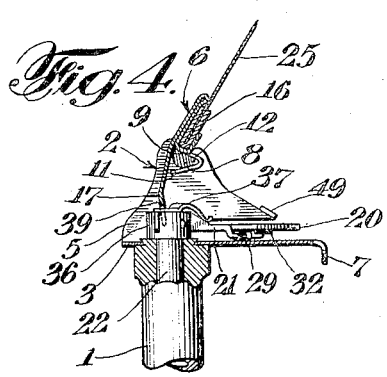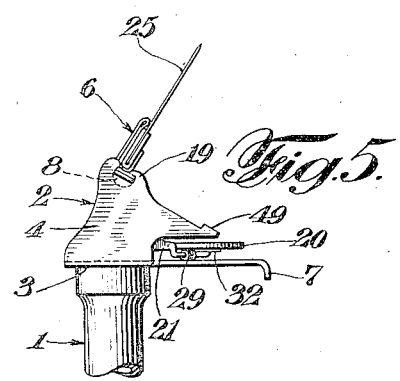

March 3, 1936. H. DE HAVEN 2,032,739
SELF SHARPENING RAZOR
Filed June 20, 1930 3 Sheets-Sheet 3
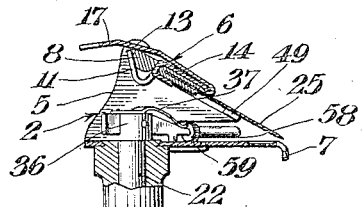
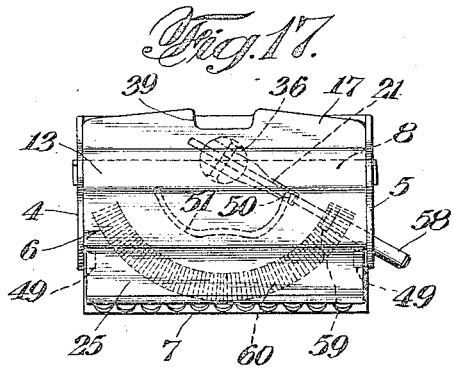
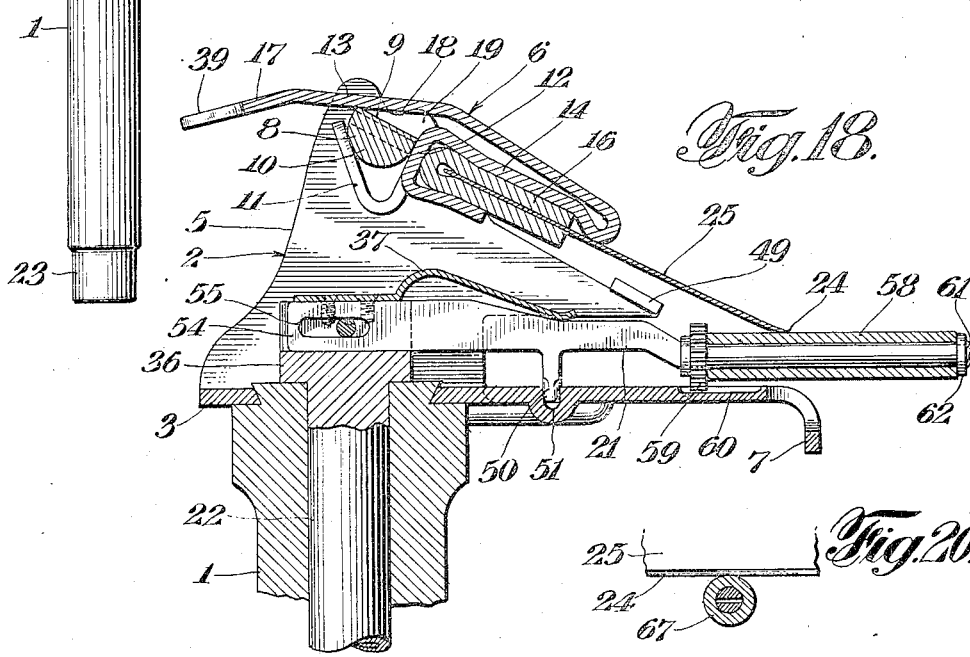
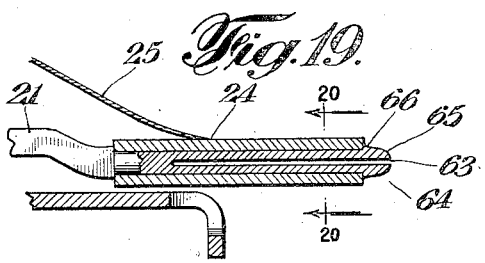
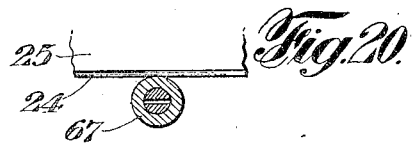
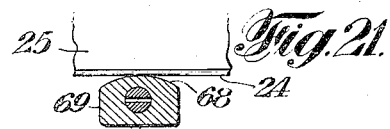
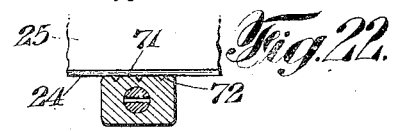
INVENTOR
Hugh De Haven
BY
Prindle, Bean & Mann
his ATTORNEYS.

Patented Mar. 3, 1936

2,032,739

UNITED STATES PATENT OFFICE 2,032,739

SELF SHARPENING RAZOR

Hugh De Haven, New Canaan, Conn., assignor to De Haven Razor Corporation, a corporation of Delaware Application June 20, 1930, Serial No. 462,520

40 Claims. (Cl. 30—36)

This invention relates to a razor having means thereon for sharpening the blade.

In my Patent No. 1,718,219, dated June 25, 1929, I have shown a razor in which the blade edging element is reciprocable across or transverse of the blade edge. I now have developed a somewhat different form of razor in which the blade edging element has its principal motion lengthwise of the blade edge instead of transversely of the blade edge.

Other objects and features of the invention will more fully appear from the following claims taken in conjunction with the description and accompanying drawings, which, however, must be considered as merely illustrating the various forms of the invention and in no way limiting the invention to the several embodiments shown and described.

The drawings illustrate, in elevation, section and detail, several selected forms of construction adapted for use in such a razor, and embody the broad principles of the invention.

In the drawings:

Fig. 1 is a side view of one form of the razor, the head of the razor being shown in section;

Fig. 2 is a plan view of the razor shown in Fig. 1;

Fig. 3 is an enlarged detail sectional view of the head of the razor shown in Fig. 1 with the blade edging element mid-way of its stroke;

Fig. 4 is a side view of the razor shown in Fig. 1 with the blade and blade holder in raised position for removal of the blade, the head of the razor being in section;

Fig. 5 is a side view of the razor with the parts in the position shown in Fig. 4;

Fig. 6 is a side view of the razor with a somewhat different form of blade edging element, the head of the razor being shown in section;

Fig. 7 is a plan view of the razor shown in Fig. 6;

Fig. 8 is an enlarged detail sectional view of the head of the razor shown in Fig. 6 with the blade edging element mid-way of its stroke;

Fig. 9 is a detail of the blade edging element used on the razor shown in Fig. 8;

Fig. 10 is a detail of the blade edging element shown in Fig. 8 with the upper surface of the blade edging element used to condition only one side of the blade edge;

Fig. 11 is a detail of a slightly different form of the blade edging element used to condition the blade edge;

Figs. 12, 13 and 14 show various forms that the surface of the blade edging element which is in contact with the edge of the blade, may have;

Fig. 15 is a detail of another form of blade edging element;

Fig. 16 is a side view of the razor with still another form of the blade edging element, the head of the razor being shown in section;

Fig. 17 is a plan view of the razor shown in Fig. 16;

Fig. 18 is an enlarged detail sectional view of the head of the razor shown in Fig. 16 with the blade edging element mid-way of its stroke;

Fig. 19 is a longitudinal section through still another form of blade edging element;

Fig. 20 is a section on line 20—20 of Fig. 19; and

Figs. 21 and 22 show forms of blade edging elements which may be substituted for that shown in Fig. 19.

Only such parts of the razor and the mechanism thereof are illustrated as is necessary to show some of the various forms which the invention may take and to show the operation thereof.

The type of razor which is shown and which will hereinafter be described, is intended primarily to sharpen the razor blade by a relative movement of the blade sharpening element lengthwise of the edge of the blade, as distinguished from a movement which is altogether transverse of the edge of the blade. The blade edging element is in contact with the edge of the blade when the blade is to be sharpened and the relative movement of the blade and the blade edging element, while in contact, operate to sharpen the blade edge either by grinding the edge of the blade or by straightening the edge of the blade, or both.

As illustrated herein, the razor includes a handle 1 and an upper part or head which is designated generally by the numeral 2. The head of the razor preferably has a base 3 from which the side pieces 4 and 5 extend upwardly to support the blade holder which is designated generally by the numeral 6. The forward end of the base 3 of the head may be cut out to form the guard teeth 7. A rod 8 extends between the side pieces 4 and 5 of the razor head and supports the blade holder 6. The rod 8 preferably has a flat surface 9 and a round surface 10 which cooperate with the bearing parts 11, 12 and 13 of the blade holder to hold the blade holder and blade in the raised position shown in Fig. 4, or to exert a spring action forcing the edge of the blade downwardly against the various forms of blade edging elements which can be used. The blade holder is preferably made of a springy material so that the parts 11, 12 and 13 are pressed against the rod 8 with a spring action. From a consideration of Fig. 4 it will be seen that the blade holder is held in its upper position because the flat side of part 12 of the blade holder rests against the flat side 9 of the rod and when the parts are in the position shown in Fig. 3 the bearing part 13 with the blade holder tends to lie flatly against the flat side 9 of the rod and this tendency causes the blade holder to press the blade downwardly against the blade edging element. The blade holder is also provided with the parts 14 and 15 which clamp the backing 16 of the razor blade to hold the blade in the blade holder. The blade is preferably moved from the cap or blade holder 6 by pressing down on the thumb-piece 17 of the blade holder to raise the cap from the position shown in Fig. 3 to the position shown in Fig. 4, whereupon the blade can be slid sidewise out of the blade holder. Notches 18 are provided in the arms 4 and 5 in such a position that they permit the blade to slide sidewise from the blade holder when the blade holder or cap is in its raised position, as is shown in Fig. 4, but when the blade holder is in its lowered position, as is shown in Fig. 3, the hump-like portions 19 of the sides 4 and 5 prevent the removal of the blade.

The blade edging element which is shown in Figs. 1–5 is a flat disc or wheel 20 which reciprocates lengthwise of the blade edge relatively thereto, being supported on and moved lengthwise of the blade edge by the supporting arm 21. The arm 21 is reciprocated by rotating the shaft 22 which extends downwardly through the handle 1 of the razor and terminates at its lower end in a grip 23 which is preferably knurled to enable it easily to be grasped and moved when it is desired to rotate the shaft 22 to reciprocate the arm 21 and the blade edging element 20. The blade edging element 20 may be of any suitable material and the surface which contacts with the cutting edge 24 of the steel body 25 of the blade may be either smooth or rough, depending upon whether it is desired to polish the edge of the blade or grind it. For polishing the edge of the blade the disc may be made of a material, such as rustless steel, with a highly polished surface 26, and for grinding the edge of the blade an abrasive may be put on the highly polished surface or a wheel having a relatively rough grinding surface may be substituted for the wheel or disc having the smooth polishing surface. In order to enable wheels of different kinds to be applied and removed, a screw 27 is used to hold the disc 20 on the arm 21.

It is considered desirable to have the disc 20 rotate when it is reciprocated lengthwise of the edge of the blade in order to give a grinding movement which has a component of motion across the blade edge in addition to having the motion lengthwise of the blade edge. For this purpose the under-surface of the blade edging element may be provided with teeth 28 which mesh with a pinion 29. The teeth on the pinion 29 also mesh with the teeth of a rack 30 which may conveniently be formed in the base 3 of the head of the razor. With this arrangement, the disc 20 will rotate about the pivot screw 27 as the disc reciprocates lengthwise of the blade edge. Bearings 31 and 32, which are preferably metal discs, permit the disc 20 to rotate easily. The bearing 32 provides a rather wide support for the disc 20 to prevent it from tilting and serves to support the blade edging disc 20 a suitable distance above the supporting arm 21 so that the teeth of the disc may engage the teeth of the pinion 29 without binding. A sleeve 33, which fits around the forward part 34 of the supporting arm 21, properly positions the pinion 29 to prevent it from binding against the inner ends of the teeth 28 of the blade edging disc 20. This forward end 34 of the supporting arm 21 may also be of steel and suitable for wiping the edge of the blade to sharpen the blade edge with the grinding disc 20 and its associated pinion 29, removed.

The arm 21 is preferably pivotally connected on the pivot 35 to the head 36 of the shaft 22 so that the arm 21 can be raised to remove the pinion 29 when necessary. A spring 37 bears against the arm 21 to hold the pinion 29 down against the rack 30 when the blade is raised from the position shown in Fig. 3 to the position shown in Fig. 4. The inner end of the spring 37 is fastened to the head 36 of the shaft 22 in any suitable manner, for instance by the screw 38. The tail or thumb-piece 17 of the cap or blade holder 6 is preferably notched or cut away at 39 so that when the blade holder is in the raised position shown in Fig. 4 the tail or thumb-piece of the cap may pass by the head 36 of the shaft 22.

In order to operate the razor shown in Figs. 1–5 to sharpen the blade, it is necessary only to grasp the handle and then twist the grip 23 back and forth, which causes the blade edging element 20 to reciprocate lengthwise of the blade edge. During the lengthwise reciprocation, the blade edging element has another movement transverse of the blade edge, thus the blade edging element has a component of motion lengthwise of the blade edge and another component of motion across the blade edge. It will be noticed that the edge of the blade is given three different treatments by the disc: As the disc moves it both revolves and moves lengthwise of the blade edge so that one portion of the disc is moving against the blade edge with a honing stroke, that is one portion of the disc is moving from the cutting edge of the blade toward the rear of the blade; another portion of the disc is giving the edge of the blade a stropping stroke, that is, this portion of the disc is moving out from under the blade, or, in other words, is moving from the rear of the blade toward the cutting edge, or, stated another way, is moving with the blade edge; while another portion of the disc is moving along or lengthwise of the blade edge. This combined movement very effectively straightens any portions of the thin cutting edge of the blade which are turned over during the shaving operation and grinds or polishes the edge of the blade.

In the form of razor shown in Figs. 6, 7 and 8, a somewhat different form of blade edging element is used. This form of blade edging element includes the upper part 40 and the lower part and is adapted to sharpen both sides of the blade edge at the same time if desired. The lower part of the blade edging element is preferably in the form of a yoke having the parallel arms 41 and 42, and the upper part 40 of the blade edging element may conveniently be a single arm which is rotatably mounted on the pivot 43 and spring pressed against the upper side of the cutting edge of the blade by means of the spring 44. The spring 44 should exert a very light pressure so as to cause the arm 40 of the blade edging element to bear only lightly against the upper surface of the blade edge in order not to distort the edge.

The upper surfaces of the yoke arms 41 and 42 of the blade edging element and the under surface of the arm 40 of the blade edging element, are such that they grind or polish the edge of the blade. The upper surface 45 of the arm 40 may also be used to grind or polish the edge of the blade and may have grinding or polishing characteristics which are different from those of the under surface of the arm 40, or the upper surfaces of the yoke arms 41 and 42. Some of the forms which the upper surface of the arm 40 may take are shown in Figs. 12, 13 and 14. In Fig. 12 the upper surface 45 of the arm 40 is round, whereas in Fig. 13 it is curved on a larger radius, and in Fig. 14 the surface 45 is substantially flat with grooves 46 adapted to hold grinding or polishing materials. When using the upper surface 45 of the arm 40, the arm is supported between the yoke arms 41 and 42 on the bridging bar 47 (as shown in Fig. 10) which bridges the space between the yoke arms 41 and 42 and supports the arm 40 so that its upper surface 45 may be used to sharpen the edge of the blade.

In some instances it may be desirable to use a sharpening element such as is shown in Fig. 11 where the under surface of the arm 40 is used to sharpen the upper surface of the blade edge after which the arm 40 is lowered so that it rests on the bridging bar 47 whereby the upper surface of the arm 40 may be used to sharpen the under side of the blade edge. In this form of blade edging element, the yoke arms 41 and 42 may be cut away as is indicated at 48 so that they do not contact with the under surface of the blade edge, in which case the blade is held at substantially the angle shown in Fig. 11 by resting on the inturned ears 49 which are on the forward edges of and turned inward from the sides 4 and 5 of the razor head. These inturned ears 49 also serve to position the blade with respect to the guard teeth, as is shown in Figs. 1 and 6, when the blade edging element is in its extreme position to the right or to the left of the razor, as would happen when the razor is being used for shaving.

In the case where the blade edging element has the scissor-like form shown in Figs. 6–11, the supporting arm 21 is provided with a guide such as the projecting pin 50 which operates in a guiding slot 51 formed in the base 3 of the razor head. This guiding slot 51 may have any desired form. As is shown in Fig. 7 the slot is somewhat arcuate at the portion 52 so that as the scissor-like blade edging element moves lengthwise of the blade edge, the supporting arm 21 and the blade edging element is drawn inwardly against the edge of the blade to maintain the arms 39 and 40 in substantially the same angular relation so that the angle on the edge of the blade will be substantially the same throughout the length of the blade edge. The slot 51 turns sharply rearwardly at the portions 53 to draw the supporting arm 21 and the blade edging element somewhat under the blade in order to get it out of the way when it is not being used to sharpen the blade. In order to permit the supporting arm 21 and the blade edging element to assume the various positions shown in Fig. 7, the rear end 54 of the supporting arm 21 is provided with a slot 55 which cooperates with the supporting pin 35.

The form of blade edging element shown in Fig. 15 may be substituted for those shown in Figs. 6–11. This form of blade edging element includes a pair of balls 56 held within a casing 57 which is on the end of the supporting arm 21.

The balls 56 have very little tendency to grind the edge of the blade but merely straighten out those portions of the blade edge which were curled over or bent during the previous shave.

In Figs. 16–22 there is shown still another form of blade edging element. The forward end 34 of the supporting arm 21 is in the form of an axle upon which a rotatable blade edging element 58 may be mounted. This blade edging element is provided with a pinion 59 which meshes with the teeth in a rack 60 so that as the shaft 22 is rotated the blade edging element is moved lengthwise relatively to the blade edge and is also rotated by the cooperation of the pinion 59 and the teeth 60. In this form of razor, use is made of the cooperating guide pin 50 and guide slot 51, as was previously explained with regard to the form of razor shown in Figs. 6–8. The guide slot may have any desired form and, as is shown in Fig. 17, may be used to cause the blade edging element to move backwards and forwards transversely of the blade edge while the blade edging element is moving lengthwise of the blade edge and is being rotated by the action of the pinion 59. The rack 60 should be relatively wide to allow for the movement of the pinion 59 which is caused by the action of the projecting pin 50 and the guiding slot 51. Although a particular form of guiding slot 51 is shown in Fig. 17, any suitable form of slot may be used to cause any desired movement of the blade edging element across or transverse of the blade edge and the rear end 54 of the supporting arm 21 is provided with the slot 55 to permit the movement of the arm 21 and blade edging element 58 transverse of the edge of the blade. The blade edging element shown in Fig. 18 is held on the forward end 34 of the supporting arm 21 in any suitable manner, as by the screw 61 and the washer 62. In this form of razor, as in the form of razor shown in Fig. 3, the forward end 34 of the arm 21 may, itself, be a blade edging element which wipes the blade edge both lengthwise of the edge and transversely of the edge but which has no rotating movement.

In Figs. 19–22 several different forms of blade edging elements substantially similar to those shown in Figs. 12–14 are illustrated. These blade edging elements each have a hole longitudinally through them so that they may be mounted on the forward end of the supporting arm 21. The forward end of the supporting arm 21 is bifurcated at 63 and the parts 64 and 65 have a tendency to spring apart. The blade edging elements are forced onto the forward end of the supporting arm 21, after which the parts 64 and 65 spring apart. The outer end of the parts 64 and 65 are slightly enlarged at 66 to form a stop, against which the outer end of the blade edging element can bear to prevent the blade edging element from slipping off of the forward end of the supporting arm 21. By pressing together the parts 64 and 65, the blade edging element may be slipped over the stop 66 so that any blade edging element may be removed from or put on the arm.

Many different blade edging elements having as many different sharpening characteristics may be used. The forward end of the arm 21 may, of itself, be a blade edging element having one characteristic. The round blade edging element 67 which is shown in Fig. 20 may have another sharpening characteristic. The blade edging element shown in Fig. 21 has an upper surface 68 which is more flat than the blade edging element shown in Fig. 20 and the side surfaces 69 and the bottom surface 70 may have other sharpening characteristics, any of the surfaces being adaptable for contact with the edge of the blade to sharpen it. For instance, the forward end of the supporting arm 21 may be of hard polished metal, which will smooth the edge of the blade, while the blade edging element 67 may be of a rough material which will grind the edge of the blade while it wipes across the blade edge. The various faces 68, 69 and 70 of the blade edging elements shown in Fig. 21 may be of various degrees of roughness so as to have different sharpening effects on the blade edge. The blade edging element shown in Fig. 22 may have an upper surface 71 containing indentations or grooves 72 to hold abrasive or polishing compound and the other faces of this blade edging element may have still other sharpening characteristics.

I claim:

1. A safety razor comprising in combination a blade and a blade edging element so mounted that it may be made to contact the blade edge or to be retracted therefrom, as desired, and having its principal movement lengthwise of the blade edge and another movement transverse of the blade edge.

2. A safety razor comprising in combination a blade and a blade edging element so mounted that it may be made to contact the blade edge or to be retracted therefrom, as desired, and reciprocable lengthwise of the blade edge and having a component of motion across the blade edge.

3. A safety razor comprising in combination a blade and a blade edging element so mounted that it may be made to contact the blade edge or to be retracted therefrom, as desired, and reciprocable lengthwise of the blade edge and having a component of motion across the blade edge, the component of motion across the blade edge being from the rear of the blade toward the cutting edge of the blade during a part of the lengthwise reciprocation.

4. A safety razor comprising in combination a blade and a blade edging element so mounted that it may be made to contact the blade edge or to be retracted therefrom, as desired, and reciprocable lengthwise of the blade edge and having a component of motion across the blade edge, the component of motion across the blade edge being from the cutting edge of the blade toward the rear of the blade during a part of the lengthwise reciprocation.

5. A safety razor comprising in combination a blade and a blade edging element so mounted that it may be made to contact the blade edge or to be retracted therefrom, as desired, and reciprocable lengthwise of the blade edge and having a component of motion across the blade edge, the component of motion across the blade edge being from the rear of the blade toward the cutting edge of the blade during a part of the lengthwise reciprocation and being from the cutting edge of the blade toward the rear of the blade during another part of the lengthwise reciprocation.

6. A safety razor comprising in combination a blade and a blade edge wiping element adapted to give a wiping motion lengthwise of the blade edge, in combination with a blade edge grinding element to be substituted for the wiping element.

7. A safety razor comprising in combination a blade and a blade edging element having a rotary motion lengthwise of the blade edge in contact therewith.

8. A safety razor comprising in combination a blade and a blade edging element movable lengthwise of the blade edge and having a rotary motion in contact with the blade edge simultaneously with the lengthwise motion.

9. A safety razor comprising in combination a blade and a blade edging element, means to support the blade edging element and to cause it to wipe lengthwise of the blade edge, the blade edging element being removable from the support.

10. A safety razor comprising in combination a blade and a pivot blade edging element movable lengthwise of the blade edge and rotatable on a pivot simultaneously with the lengthwise movement.

11. A safety razor comprising in combination a blade and a blade edging element, the blade edging element being pivoted on a pivot which is non-parallel to the edge of the blade.

12. A safety razor comprising in combination a blade and a blade edging element pivoted on a pivot non-parallel with the blade edge and having a movement lengthwise of the blade edge.

13. A safety razor comprising in combination a blade and a blade edging element pivoted on a pivot non-parallel with the blade edge and having a movement across the blade edge.

14. A safety razor comprising in combination a blade and a blade edging element pivoted on a pivot non-parallel with the blade edge and having the components of motion lengthwise of the blade edge and across the blade edge.

15. A safety razor comprising in combination a blade and a blade edging element movable about two axes non-parallel with the blade edge, the movement about one axis being principally lengthwise of the blade edge and the movement about the other pivot being across the blade edge.

16. A safety razor comprising in combination a blade and a blade edging element movable lengthwise of the blade edge and guiding means to cause movement of the blade edging element across the blade edge during the lengthwise movement.

17. A safety razor comprising in combination a blade and a blade edging element so mounted that it may be made to contact the blade edge or to be retracted therefrom, as desired, and having a movement lengthwise of the blade edge and means to cause the blade edging element to rotate in contact with the blade edge while moving lengthwise of the blade edge.

18. A safety razor combining in combination a blade and a blade edging roller so mounted that it may be made to contact the blade edge or to be retracted therefrom, as desired, and pivoted on an axis non-parallel to the blade edge.

19. A safety razor comprising in combination a blade, and a blade edging roller so mounted that it may be made to contact the blade edge or to be retracted therefrom, as desired, and pivoted on an axis non-parallel to the blade edge, and means to cause the roller to rotate with its surface in contact with the blade edge.

20. A safety razor comprising in combination a blade and a flat surfaced blade edging element so mounted that it may be made to contact the blade edge or to be retracted therefrom, as desired, and pivoted on an axis non-parallel to the blade edge.

21. A safety razor comprising in combination a blade and a flat surfaced blade edging element so mounted that it may be made to contact the blade edge or to be retracted therefrom, as desired, and pivoted on an axis non-parallel to the blade edging and means to cause it to rotate with its surface in contact with the blade edge.

22. A safety razor comprising in combination a blade and a flat surfaced blade edging element so mounted that it may be made to contact the blade dege or to be retracted therefrom, as desired, and pivoted on an axis non-parallel to the blade edge, and means to cause it to rotate with its surface in contact with the blade edge while bodily moving substantially lengthwise of the blade edge.

23. A safety razor comprising in combination a blade and a flat surfaced blade edging element so mounted that it may be made to contact the blade edge or to be retracted therefrom, as desired, and pivoted on an axis non-parallel to the blade edge, and means to cause it to rotate with its surface in contact with the blade edge while moving bodily with a component of motion parallel to the blade edge and a component of motion across the blade edge.

24. A safety razor comprising in combination a blade and a blade edging element so mounted that it may be made to contact the blade edge or to be retracted therefrom, as desired, and reciprocable lengthwise of the blade edge in contact therewith, and means to cause a predetermined movement of the blade edging element across the blade edge during the lengthwise movement.

25. A safety razor comprising, in combination, a support, a blade mounted thereon, a guard to coact with an edge of said blade while shaving, a hone plate movably mounted on said support, means to move said plate between fixed limits to shaving and honing positions and means carried by said support to cause relative movement between said blade and plate while the latter is maintained at the limit of movement to honing position.

26. A safety razor comprising, in combination, a support, a shaving guard and a blade mounted thereon to coact in shaving, a hone mounted on said support for movement in a plane at an angle to the plane of the blade and in contact with an edge of the blade and means carried by the support to cause such movement of the hone.

27. A safety razor comprising, in combination, a support, a shaving guard and a blade mounted thereon to coact in shaving, a hone formed with a plane honing surface mounted on said support for movement in its plane with said surface in contact with an edge of the blade.

28. A safety razor comprising, in combination, a support, a shaving guard and a blade mounted thereon to coact in shaving, a hone mounted thereon for movement in contact with an edge of said blade and in a plane at an angle to the plane of the blade, rotary means to move said hone in its plane, and guide means to modify such movement to cause each operative point of the hone to move in a cycloidal path when actuated to treat said edge.

29. A safety razor comprising, in combination, a support, a shaving guard and a blade mounted thereon to coact in shaving, a hone mounted thereon for movement in contact with an edge of said blade and in a plane at an angle to the plane of the blade, rotary means acting on said hone opposite a point midway of the length of the blade to move said hone in its plane, and guide means to modify such movement to cause each operative point of the hone to move in a cycloidal path with the major axes of the cycloids at other than right angles to the edge of the blade when actuated to treat said edge.

30. A safety razor comprising, in combination, a support, a blade member and a guard member mounted on said support in shaving coactive relation, one of said members mounted for movement of separation from the other thereof, a hone normally housed laterally in an angle between said members, means to move said hone to a position between said members into contact with the edge of said blade, and means to cause sharpening relative movement between said hone and blade when so inserted.

31. A safety razor comprising, in combination, a support, a guard carried thereby, a blade movably mounted on said support for movement from and parallel with said guard, yielding means urging said blade toward said guard, a hone formed with a plane honing surface normally housed in an angle between said guard and blade, means to move said hone to a position between said guard and blade with said yielding means exerting pressure of the blade on the honing surface, and means to cause relative honing movement between said hone and blade.

32. A blade sharpening device comprising, in combination, a supporting plate, a hone slidable on said plate, means to mount a blade upon said plate at an angle to and with its edge in contact with said hone, a crank for imparting movement to said hone, means to drive said crank and guide means to control the movement of said hone in such a manner as to cause each point of the hone contacting with the blade to move in a cycloidal path.

33. A safety razor comprising, in combination, a frame and a guard carried thereby, a blade supporting base plate pivoted on said frame on an axis parallel with said guard, a rod mounted axially of said pivot having a flat face, resilient means carried by the plate coacting with said flat face to exert pressure of an edge of a blade carried by the plate against the guard in one position and to hold the blade spaced from the guard in another position of rotation of the plate upon its axis, and means to clamp a blade upon said plate with its edge exposed for shaving.

34. A safety razor comprising, in combination, a support, a shaving guard carried thereby, a blade member, a hone member, means to mount one of said members on said support at an acute angle to the other thereof, means to mount the remaining member on said support for movement in its plane, means to move said movable member to honing position with the edge of the blade in contact with the hone, rotary drive means to move one point of said movable member in a circle, and means coacting with said drive means to modify the motion of other points of said movable member to cycloidal honing movement.

35. In a safety razor, a blade, blade treating means and a handle comprising means supporting said blade and blade treating means for relative rotation about an axis normal to said blade treating means, said blade treating means engaging said blade upon relative rotation thereof.

36. In a safety razor, a blade, a blade guard, blade treating means between said blade guard and blade and means supporting said blade and blade treating means for relative rotation about an axis normal to said blade treating means, said blade treating means engaging said blade upon relative rotation thereof.

37. A safety razor comprising in combination a blade and a blade edging element so mounted that it may be made to contact the blade edge or to be retracted therefrom, as desired, and having its principal movement lengthwise of the blade edge in contact therewith to sharpen the edge while the blade is substantially in shaving position.

38. A safety razor comprising in combination a blade and a blade-edging element adapted to contact with the blade edge and to give a wiping motion lengthwise of the blade edge, while the blade is substantially in shaving position.

39. A razor blade sharpening device comprising in combination a blade and a blade-edging device so mounted as to sharpen with and against the blade edge at the same time.

40. A safety razor comprising in combination a blade, a blade-sharpening device mounted therein, and means for operating the sharpening device by a movement other than the movement of the sharpening device.

HUGH DE HAVEN.

CERTIFICATE OF CORRECTION.

Patent No. 2,032,739. March 3, 1936.

HUGH DE HAVEN.

It is hereby certified that error appears in the printed specification of the above numbered patent requiring correction as follows: Page 4, first column, lines 68 and 73, claims 6 and 7; and second column, lines 2, 13, 22, 26, 30, 35 and 41, claims 8, 10, 12, 13, 14, 15 and 16 respectively, after "element"and in lines 7 and 18, claims 9 and 11 respectively,after the comma following the word "element",insert the words so mounted that it may be made to contact the blade edge or to be retracted therefrom, as desired, and; same page, second column, line 54, claim 18, for "combining" read comprising; page 5, first column, line 7, claim 22, for "dege" read edge; and that the said Letters Patent should be read with these corrections therein that the same may conform to the record of the case in the Patent Office.

Signed and sealed this 14th day of April, A. D. 1936.

Leslie Frazer (Seal) Acting Commissioner of Patents.